(12) United States Patent
Solty

(10) Patent No.: US 9,770,852 B2
(45) Date of Patent: Sep. 26, 2017

(54) POWDER PRESS OR POWDER PRESS ADAPTER, AND METHOD FOR OPERATING A POWDER PRESS

(75) Inventor: Walter Solty, Hueckelhoven (DE)

(73) Assignee: SMS group GmbH, Duesseldorf (DE)

( * ) Notice: Subject to any disclaimer, the term of this patent is extended or adjusted under 35 U.S.C. 154(b) by 1056 days.

(21) Appl. No.: 13/977,077

(22) PCT Filed: Dec. 29, 2011

(86) PCT No.: PCT/DE2011/002187
§ 371 (c)(1),
(2), (4) Date: Aug. 16, 2013

(87) PCT Pub. No.: WO2012/089198
PCT Pub. Date: Jul. 5, 2012

(65) Prior Publication Data
US 2013/0320593 A1 Dec. 5, 2013

(30) Foreign Application Priority Data

Dec. 30, 2010 (DE) .................. 10 2010 056 476
May 5, 2011 (DE) .................. 10 2011 100 618

(51) Int. Cl.
| | | |
|---|---|---|
| *B29C 43/36* | (2006.01) | |
| *B30B 11/02* | (2006.01) | |
| *B30B 15/04* | (2006.01) | |
| *B30B 15/02* | (2006.01) | |

(52) U.S. Cl.
CPC .......... *B29C 43/361* (2013.01); *B30B 11/02* (2013.01); *B30B 15/028* (2013.01); *B30B 15/041* (2013.01)

(58) Field of Classification Search
CPC ..... B29C 43/361; B30B 11/02; B30B 15/028; B30B 15/041
See application file for complete search history.

(56) References Cited

U.S. PATENT DOCUMENTS

| | | |
|---|---|---|
| 3,353,215 A | 11/1967 | Haller |
| 5,218,901 A | 6/1993 | Imanishi |
| 7,803,294 B2 | 9/2010 | Pannewitz et al. |
| 2004/0208948 A1 | 10/2004 | Lee |
| 2008/0145466 A1 | 6/2008 | Beane |

FOREIGN PATENT DOCUMENTS

| | | |
|---|---|---|
| DE | 2 224 592 A1 | 12/1972 |
| DE | 119 745 A1 | 5/1976 |
| DE | 41 28 895 A1 | 3/1992 |
| DE | 43 07 107 C1 | 9/1994 |
| DE | 44 25 565 A1 | 2/1996 |
| DE | 10 2005 035 920 A1 | 3/2006 |
| DE | 10 2005 027 296 B3 | 11/2006 |

(Continued)

OTHER PUBLICATIONS

Austrian Search Report dated Jan. 22, 2014 in Austrian Application No. A 551/2013 with English translation of relevant parts.

(Continued)

*Primary Examiner* — Robert J Grun
(74) *Attorney, Agent, or Firm* — Collard & Roe, P.C.

(57) ABSTRACT

In a powder press, a spacer that is effective between a die plate and an opposite yoke is integrated into the die plate, particularly if the die plate is provided in an adapter, thus increasing the reliability of set-up processes.

15 Claims, 6 Drawing Sheets

(56) References Cited

FOREIGN PATENT DOCUMENTS

Figure 1:
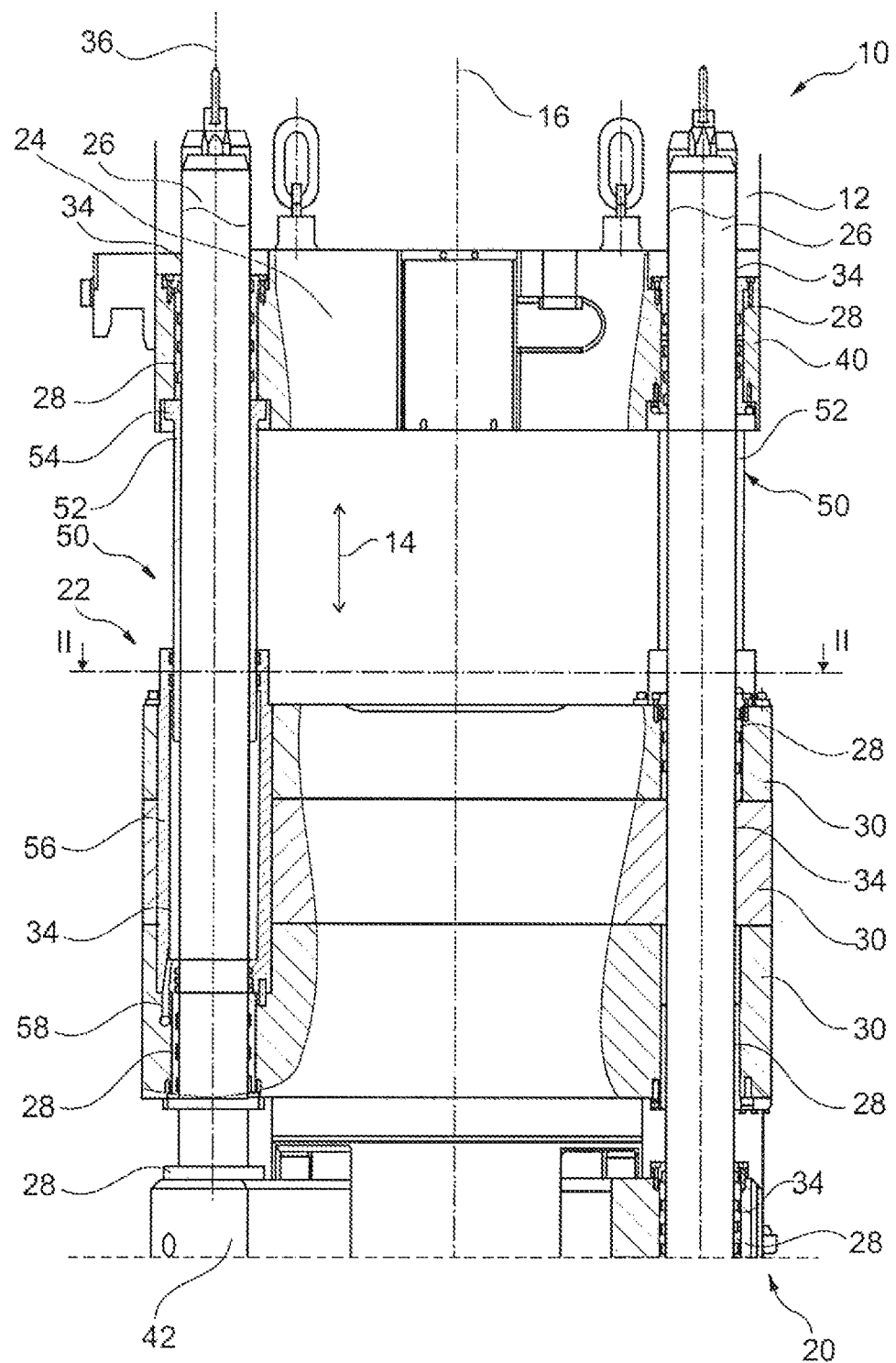

| EP | 0 053 187 A1 | 6/1982 |
| EP | 0 224 096 A2 | 6/1987 |
| EP | 1 952 975 A1 | 8/2008 |
| EP | 2 095 933 A2 | 9/2009 |
| GB | 1 398 611 A | 6/1975 |
| JP | 2007-100131 A | 4/2007 |
| JP | 2009-291799 A | 12/2009 |
| KR | 10-2011-0127780 A | 11/2011 |
| WO | WO 2012/089198 A1 | 7/2012 |

OTHER PUBLICATIONS

Austrian Search Report dated Jan. 21, 2014 in Austrian Application No. A 550/2013 with English translation of relevant parts.
International Search Report of PCT/DE2011/002187, dated Jun. 1, 2012.
German Office Action dated Mar. 7, 2013 in German Patent Application No. 10 2012 013 227.1 with English translation of the relevant parts.
German Office Action dated Mar. 8, 2013 in German Patent Application No. 10 2012 013 229.8 with English translation of the relevant parts.
European Examination Report dated Jul. 20, 2015 in European Application No. 11 822 887.3 with English translation of relevant parts.

POWDER PRESS OR POWDER PRESS ADAPTER, AND METHOD FOR OPERATING A POWDER PRESS

CROSS REFERENCE TO RELATED APPLICATIONS

This application is the National Stage of PCT/DE2011/002187 filed on Dec. 29, 2011, which claims priority under 35 U.S.C. §119 of German Application No. 10 2010 056 476.1 filed on Dec. 30, 2010 and German Application No. 10 2011 100 618.8 filed on May 5, 2011, the disclosures of which are incorporated by reference. The international application under PCT article 21(2) was not published in English.

The invention relates to a powder press or a powder press adapter, and to a method for operation of a powder press.

In particular, the invention relates to a powder press or a powder press adapter having at least one die carrier and having at least one counter-yoke that can be displaced relative to the die carrier. Such powder presses are sufficiently known, for example, from DE 10 2005 052 158 A1 and DE 10 2005 027 296 B3, respectively. In this connection, the two documents particularly disclose a powder press adapter that allows better utilization of the press as such, because the adapters, in each instance, can be prepared outside of the press and merely introduced into the press for pressing. Furthermore, the arrangement of DE 10 2005 052 158 A1 has not only a die plate that serves as a die carrier in the present case, but also two counter-yokes, an upper and a lower adapter plate, which are vertically guided by way of guide rods, in each instance. In this connection, it is understood that depending on the concrete embodiment, two guide columns or preferably four guide columns can be used, in each instance. DE 10 2005 027 296 B3 also shows a similar structure, whereby here, multiple die plates are used, and the entire arrangement, proceeding from the lower die plate, merely works with an upper traverse as a counter-yoke.

US 2004/0208948 A1 and JP 2007-100131 A also disclose presses having a die carrier and a counter-yoke.

As is already evident from the examples described above, not only the die carrier but also the counter-yoke can be structured in relatively complex manner. Thus, for example, the die carrier can consist of multiple die plates or other devices, which remain fixed in place during pressing and form or carry a die, in which the powder to be pressed is arranged and compressed.

Likewise, the counter-yoke can have bars or a platform and, if applicable, can be a component of the press itself or also a component of an adapter. Further modules can be disposed not only on the counter-yoke but also on the die carrier, which modules are not displaced during pressing, with regard to the die carrier or with regard to the counter-yoke. These modules can be viewed, as per definition, if applicable, as components of the die carrier or of the counter-yoke, respectively.

During pressing, the powder situated in the die is subjected to a pressure required during powder pressing, by way of punches and, if applicable, further counter-punches.

As is directly evident, extensive set-up work occurs in such powder presses, for which reason powder press adapters are specifically used. In this connection, however, introduction and removal of an adapter, in each instance, already represents a relatively complex task in itself, during which die carriers and counter-yoke, in particular, must or should be positioned with a precision of a few µm. In this regard, it is known to operate a powder press in such a manner that a die carrier and at least one counter-yoke that can be displaced relative to the die carrier are held at a defined distance during a first operational state, by means of a spacer, and are released, in this regard, during a second operational state. The invention also relates to such a method.

It is the task of the present invention to make available a powder press of the stated type or a powder press adapter of the stated type, as well as a method of the stated type, for operation of a powder press, in which the set-up work can be performed in operationally more reliable manner.

A powder press or a powder press adapter having at least one die carrier and having at least one counter-yoke that can be displaced relative to the die carrier is proposed, on the one hand, as a solution by the invention, which press or adapter is characterized by a spacer that is in effect between the die carrier and the counter-yoke, which spacer is configured to maintain a distance in a first of its operational states and to be resilient in a second of its operational states. Particularly in interplay with a powder press adapter, a previously defined distance between counter-yoke and die carrier can be guaranteed in this way, in operationally reliable manner. Because only a switch between the first and the second operational state needs to occur, complicated set-up work, such as manual removal of one or more spacers, for example, can be avoided. This guarantees a high degree of security during set-up work, also in distinction from the presses disclosed in US 2004/0208948 A1 and JP 2007-100131 A, which do not provide for such a switch in operational state but rather disclose a spacer that is configured in constantly resilient manner.

The spacer can particularly be configured to be resilient, for example also as a hydraulic spring, whereby the spring force is selected in such a manner that in the first operational state, the spring is lowered hardly at all or only insignificantly as the result of the inherent weight of the module carried by it. This also guarantees great position security with regard to the distance to be maintained, whereby here, if necessary, a supplemental stop against which the spring presses can also be provided. Because forces of 1,000 t and more, for example also of 1,600 t, occur during pressing, the spring forces for the second operational state can easily be overcome in this way.

As a further solution, the present invention proposes, independent of its other characteristics, a powder press or a powder press adapter having at least one die carrier and having at least one counter-yoke that can be displaced relative to the die carrier, which are characterized by a spacer that is in effect between the die carrier and the counter-yoke, which spacer comprises a cylinder and a piston, of which one or both surround a passage opening through the die carrier or through the counter-yoke and/or a guide rod. Such a cylinder/piston unit can easily exert distance-maintaining forces fluidically, in other words hydraulically or pneumatically, and can easily be integrated into a powder press, but also into a powder press adapter, in operationally reliable manner, because corresponding hydraulic or pneumatic devices are present there in any case. Because furthermore, the forces that occur in this connection are relatively slight, in comparison with the other forces that occur in powder presses, very small piston or cylinder surfaces can already apply the required forces. Because of the fact that the cylinder and/or the piston surrounds the passage opening and/or the guide rod, cylinder(s) and piston(s), respectively, can be supplementally provided on a powder press or on a powder press adapter with an extremely small construction space, although very great forces are applied. This in turn leaves more space for possible set-up work, thereby making it possible to increase the operational reliability accordingly.

Furthermore, a spacer that comprises a cylinder and a piston can also easily be used for lifting purposes, as they particularly have to be performed during set-up work on a powder press adapter or on a powder press, for example when introducing powder into the die carrier, and ultimately are already disclosed in DE 10 2005 0.27 296 B3. Accordingly, even independent of its other characteristics of the present invention, a powder press or a powder press adapter having at least one die carrier and having at least one counter-yoke that can be displaced relative to the die carrier proves to be advantageous, which press or adapter is characterized by a lifting device that is in effect between the die carrier and the counter-yoke, which device comprises a cylinder and/or a piston, of which one or both surround a passage opening through the die carrier or through the counter-yoke and/or a guide rod. It is true that the advantages of the small construction space and the accompanying gain in space can be advantageously utilized accordingly, for set-up work, even without the configuration of the lifting device as a spacer, as is provided in DE 10 2005 027 296 B3. However, the advantages are cumulative, accordingly, if the lifting device is configured as a spacer, contrary to the teaching of DE 10 2005 027 296 B3.

Furthermore, a spacer or a lifting device, which comprises a cylinder and a piston, can be configured relatively simply, to maintain the distance in a first operational state and to be resilient in a second operational state, in that corresponding valves and, if necessary, pumps are provided, which make a required pressure available and maintain it in the first operational state, in which a distance is maintained, and allow a pressure reduction or the discharge of the corresponding fluid in the second, resilient operational state.

As a further solution, the invention proposes, independent of its other characteristics, a powder press or a powder press adapter having at least one die carrier and having at least one counter-yoke that is displaceable relative to the die carrier, which press or adapter is characterized by a lifting device that is in effect between the die carrier and the counter-yoke and is truly parallel to a punch axis. The lifting device can also be used as a spacer, because of course it is able to lift an object. Just as such lifting over a defined distance can take place, something that can be guaranteed by means of corresponding control or regulation, for example, but also by means of a suitable stop, such a lifting device can be used as a spacer, which is configured to maintain a distance in a first operational state and to be resilient in a second operational state. Likewise, it is understood that such a lifting device can be implemented in relatively uncomplicated manner, by means of a cylinder/piston unit.

Because the lifting device is provided truly parallel to a punch axis, the path of a press punch is not hindered by the lifting device, and a clear distinction from punches and their movement during pressing or after pressing, during opening, is created.

The passage opening or the guide rod, particularly if the latter is surrounded by the passage opening, can also be provided preferably truly parallel to the punch axis.

Preferably, the spacer or the lifting device is configured symmetrically with reference to a passage opening through the die carrier and/or through the counter-yoke provided truly parallel to a punch axis. In this regard, because of true parallelity, such a passage opening is specifically not the passage opening that is required for the die or contingent upon the die. Not only the die carrier but also the counter-yoke, in other words an upper plate or a lower plate, or an upper yoke or a lower yoke, or something similar, have very many complex pressure structures, such as pressure channels, valve inlets, control elements, screws, and more, for example. In the region of passage openings, which can particularly also pass through multiple die plates, however, a relatively great amount of space is generally provided, whereby the available space can be optimally utilized by means of a symmetrical arrangement of a spacer or a lifting device with reference to such a passage opening, so that a corresponding spacer can be integrated, even into existing systems, under some circumstances, even without extensive further measures. Depending on the concrete implementation, the construction space required for the spacer, in particular, can also be minimized in this way.

A passage opening for a guide rod or also, if applicable, for a tension rod, has proven to be particularly suitable, because such openings are relatively large in comparison with the other structures on the die carrier or on the counter-yoke, respectively, and therefore a relatively large free space for the corresponding spacer also remains in their surroundings.

Preferably, the spacer or the lifting device surrounds the passage opening, which can be particularly easily implemented, for example, by means of a piston/cylinder unit. Likewise, a helical spring, for example, can easily be provided, in such a manner that the spacer surrounds the passage opening and/or a corresponding guide rod or a similar module, whereby in the present connection the term "surround" is also directed at a projection of the passage opening and of the spacer parallel to the pressing direction.

In an alternative embodiment, the spacer or the lifting device can consist of multiple partial spacers, which are disposed correspondingly symmetrically around the passage opening, in each instance. In this way, as well, the risk of tilting can be correspondingly minimized.

It is understood that a spacer that is configured symmetrically with reference to a passage opening through the die carrier and/or through the counter-yoke that is truly parallel to a punch axis can advantageously be used accordingly, independent of the other characteristics of the present invention, in a powder press or in a powder press adapter having at least one die carrier and having at least one counter-yoke that can be displaced relative to the die carrier.

The task stated initially is accomplished, cumulatively or alternatively to the other characteristics of the present invention, also by a powder press or a powder press adapter having at least one die carrier and having at least one counter-yoke that can be displaced relative to the die carrier, which is characterized by a spacer that is in effect between the die carrier and the counter-yoke or by a lifting device that is in effect between the die carrier and the counter-yoke, which spacer or device comprises a module within the die carrier and/or the counter-yoke. In this way, as is directly evident, construction space can also be saved and made available for set-up work. Spring feet of springs or cylinders or pistons or parts of these, provided in the die carrier or the counter-yoke, for example, can serve as a corresponding module.

In this connection, it should be emphasized that it is true that springs are provided in the presses disclosed in US 2004/0208948 A1 or JP 2007-100131 A, which, as disclosed in US 2004/0208948 A1, can also penetrate through an ejector, if applicable. However, the springs disclosed in these two documents rest on the die carrier and the counter-yoke, in each instance, and are not countersunk into them, so that specifically, the gain in construction space described above does not exist, and correspondingly larger springs have to be used.

The solutions described above proceed, in this connection, from the common basic idea that the task stated initially can be accomplished by providing the modules that move the counter-yoke and the die carrier away from one another or separate them in as space-saving a manner as possible. For this purpose, on the one hand, modules that are themselves already present, such as a lifting device that is present in any case, for example, can be used differently, specifically, for example, as a spacer, or corresponding modules can be provided in the immediate spatial vicinity of modules that are already present, such as in the immediate spatial vicinity of guide rods or passage bores or within the die carrier or the counter-yoke.

Preferably, the spacer has a locking device, so that it can be easily released or configured to be resilient. Such a locking device can be a mechanical latch, a displaceable stop, or the like. In particular, such a locking device can be made available, in the case of a piston/cylinder unit, by means of a corresponding valve. Such a locking device particularly makes it possible to control the spacer mechanically and to reduce handling errors to a minimum in this way. In this manner, safety can be maximized in structurally simple manner.

Preferably, the powder press or the powder press adapter has at least two such spacers, particularly ones that are in effect in parallel, which can particularly be provided symmetrically with reference to the die. In this manner, tilting moments, which could possibly lead to damage of guides or the like, can be kept under control relatively easily, by way of the measures that have already been explained above. If necessary, the risk of tilting moments can already be sufficiently reduced to a minimum by means of the symmetrical configuration of the spacer with reference to a passage opening as already described above, so that further spacers as explained above, can be eliminated.

The invention furthermore proposes, as a solution for the task stated initially and in implementation of the basic idea described above, a method for operation of a powder press, in which a die carrier and at least one counter-yoke that can be displaced relative to the die carrier are held at a defined distance during a first operational state, by means of a spacer, and are released, in this regard, during a second operational state, and which is characterized in that the spacer is released in the direction of the defined distance for the release. Such a release therefore particularly eliminates removal of the spacer that might be necessary, which is structurally complicated and particularly also represents a great operational risk. For example, such a spacer that must be removed could be forgotten or not positioned correctly after pressing, when it must be put into place again. Because release of the spacer takes place only in the direction of the defined distance, the spacer can continue to remain fixed in place, for the remainder, so that further movement releases that can lead to possible errors and are also complicated can be avoided. A corresponding release can therefore take place, for example, in the pressing direction, while the spacer remains in its position for the remainder.

In this connection, holding at a defined distance guarantees the previously defined distance in operationally reliable manner, different from simple support by a spring, as US 2004/0208948 A1 or JP 2007-100131 A disclose. According to the state of the art, this distance is dependent on possible incorrect stresses and the concrete weights that bear on the springs, and therefore is not defined precisely.

Preferably, the spacer is unlocked in order to release it, which can happen, for example, by repositioning a mechanical latch or by opening the corresponding valve.

As is directly evident, die carrier and counter-yoke can generally be displaced in the pressing direction, relative to one another. Likewise, the spacer must generally be in effect in the pressing direction, because this is the degree of freedom that is permitted to the die carrier and the counter-yoke.

Depending on the concrete implementation of the present invention, the latter particularly makes a high degree of automation of the powder press or also of a powder press adapter possible, and, along with such a degree of automation, corresponding operational reliability. In particular, the possibility exists of releasing and/or fixing the spacer in place mechanically or automatically, so that in this way, operating errors can be reduced to a minimum.

In the present connection, it should be emphasized that the present invention, in distinction from DE 10 2005 027 296 B3, is aimed at a spacer that is in effect between the die carrier and counter-yoke, while the latter document merely provides for lifting devices between different die carriers. In this regard, the present invention is aimed at powder presses or powder press adapters having a counter-yoke that specifically does not represent a die holder. On the other hand, it is understood that a spacer that is in effect between the die carrier and the counter-yoke, for example, which spacer is configured symmetrically with reference to a passage opening through the die carrier and/or through the counter-yoke that is truly parallel to a punch axis, is correspondingly advantageous even in the case of a counter-yoke that itself is configured as a die carrier.

In the present connection, the term "counter-yoke" refers to any module of the powder press adapter that is configured in bridge-like manner and transfers pressing forces from a pressing punch in the direction of the die carrier, directly or indirectly, in a central region. Thus, this transfer can take place directly, on the one hand, in that the counter-yoke transfers forces to the die carrier directly or by way of a punch. Likewise, this transfer can take place indirectly, on the other hand, in that these forces are indirectly transferred from the counter-yoke to the die carrier, by way of tension rods.

Furthermore, it should be emphasized that the resilience of the spacer in its second operational state, as described above, makes a passive movement of the spacer possible, different from the movement means of DE 10 2005 027 296 B3, which are supposed to bring about a controlled movement sequence and therefore actively displace the die carrier, in each instance. This significantly simplifies process management in the case of a powder press according to the invention or a powder press adapter according to the invention.

It is understood that the characteristics of the solutions described above or in the claims can also be combined, if necessary, in order to be able to implement the advantages cumulatively, accordingly.

Figure 2:
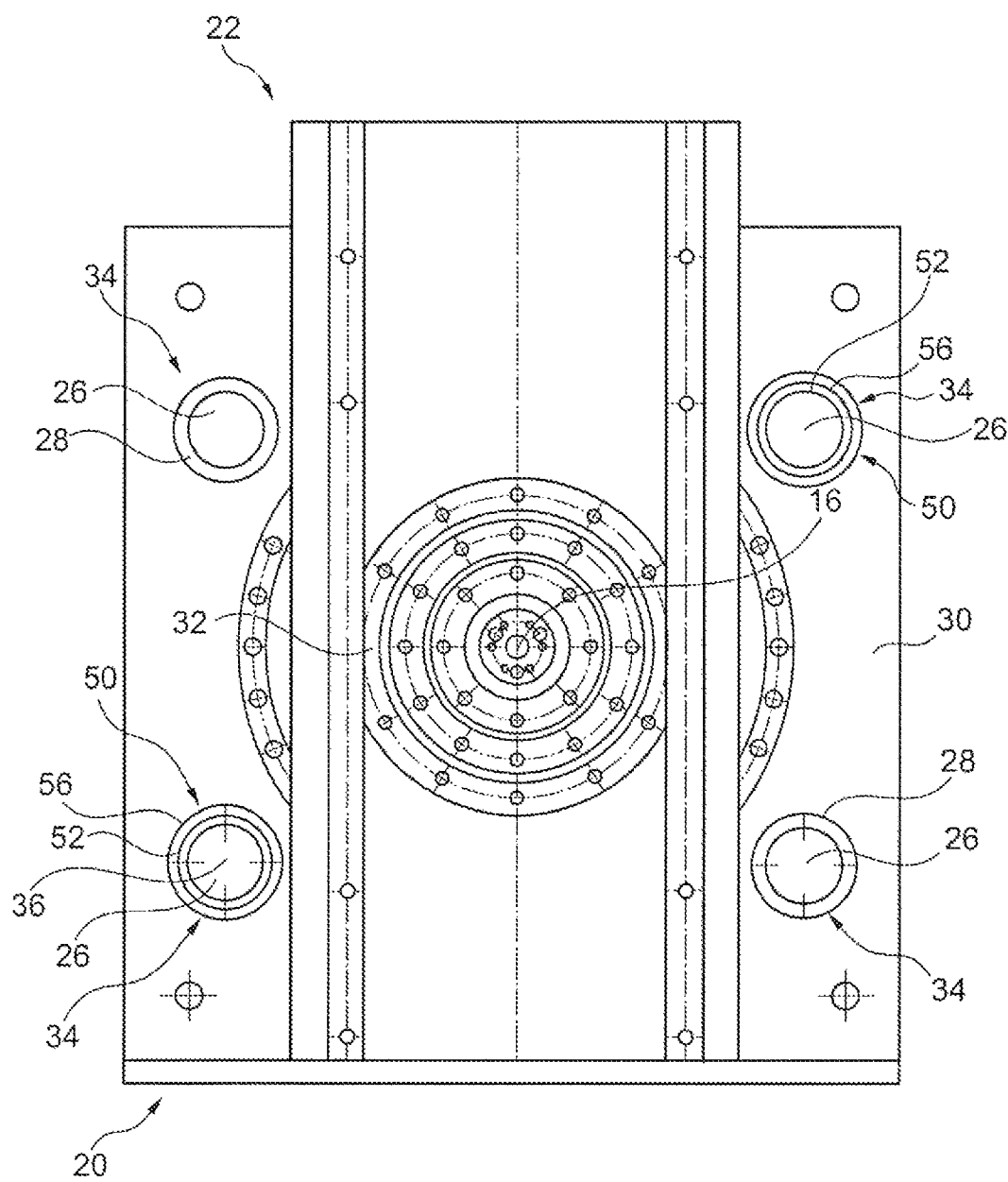
Figure 3:
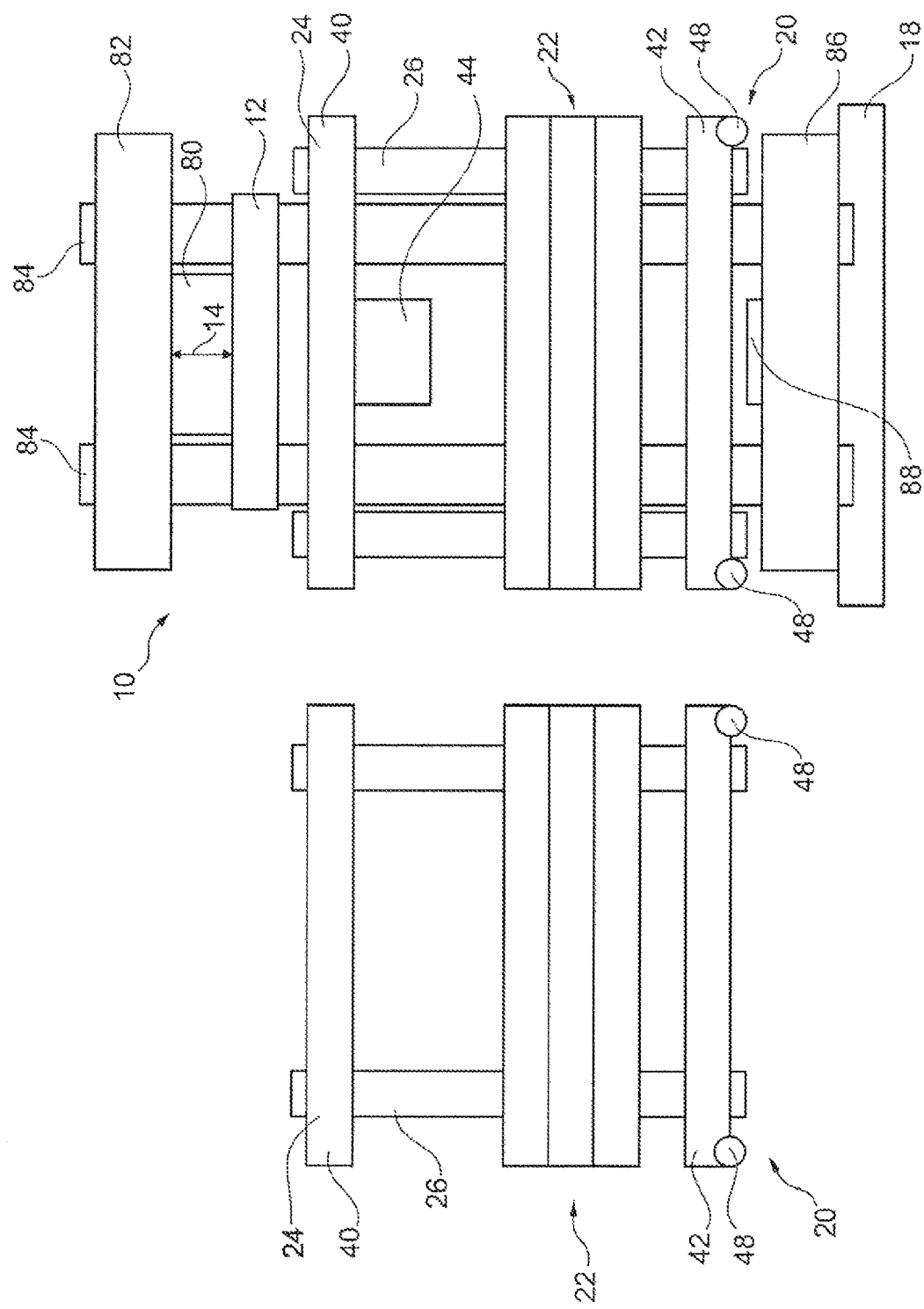
Figure 4:
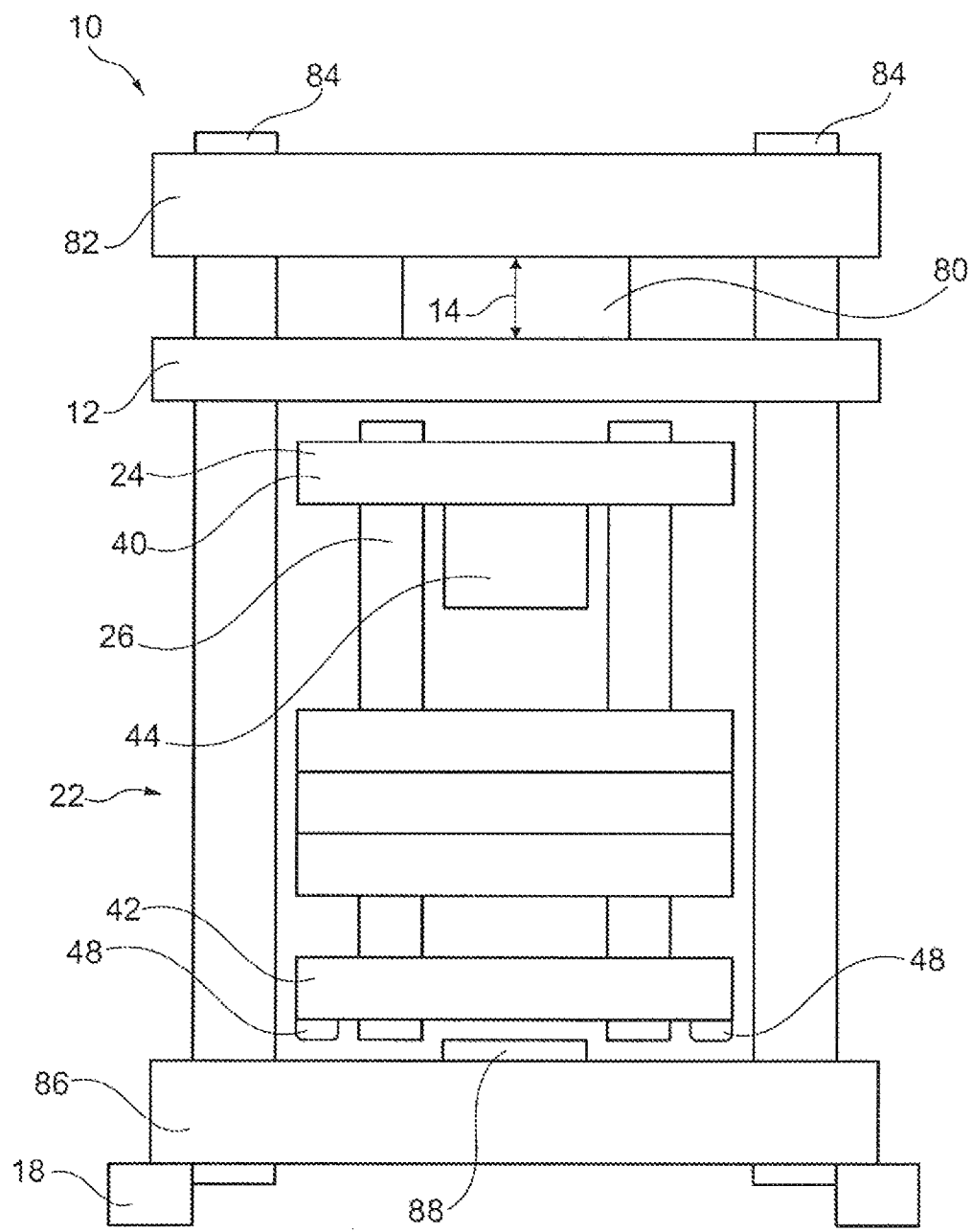
Figure 5:
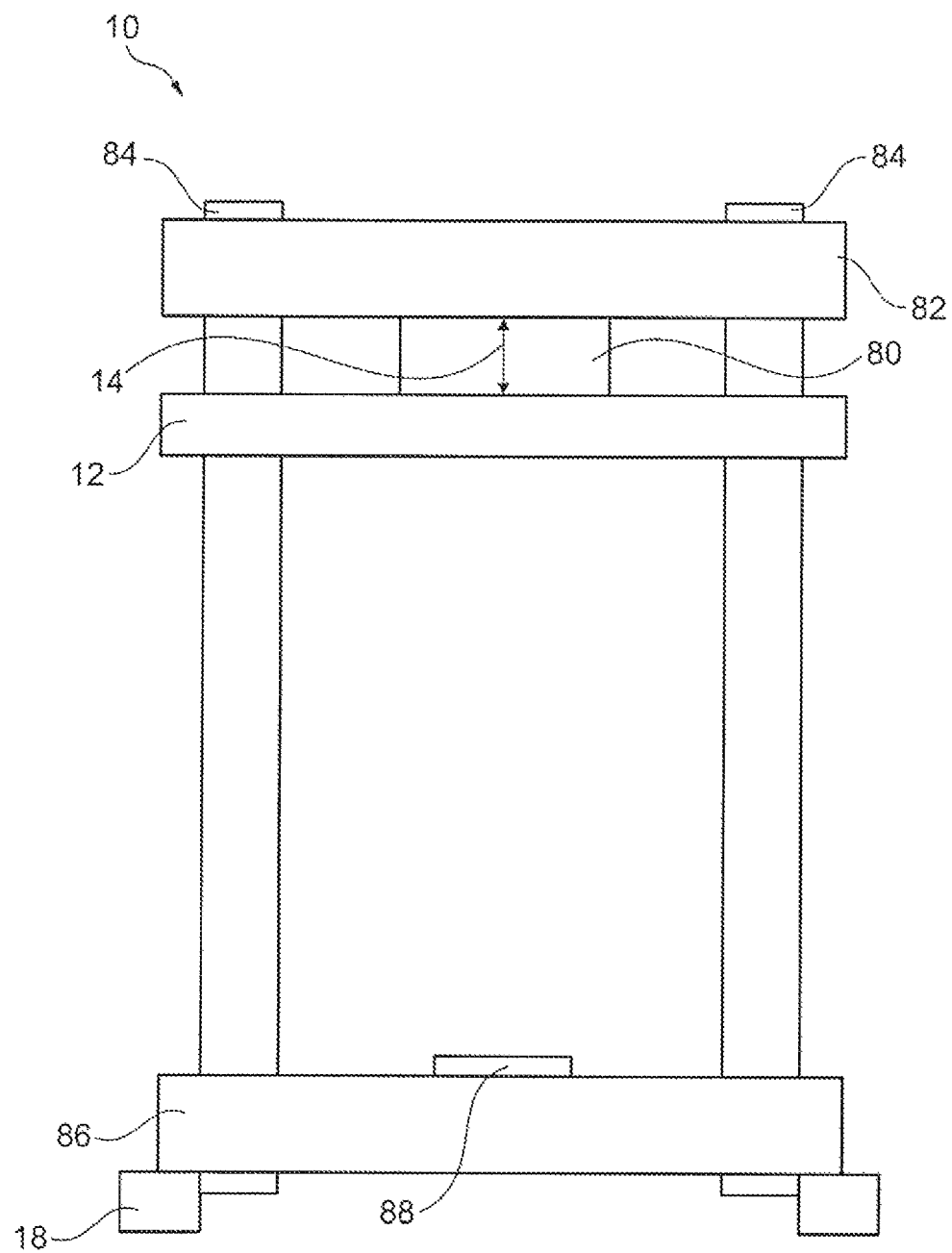
Figure 6:
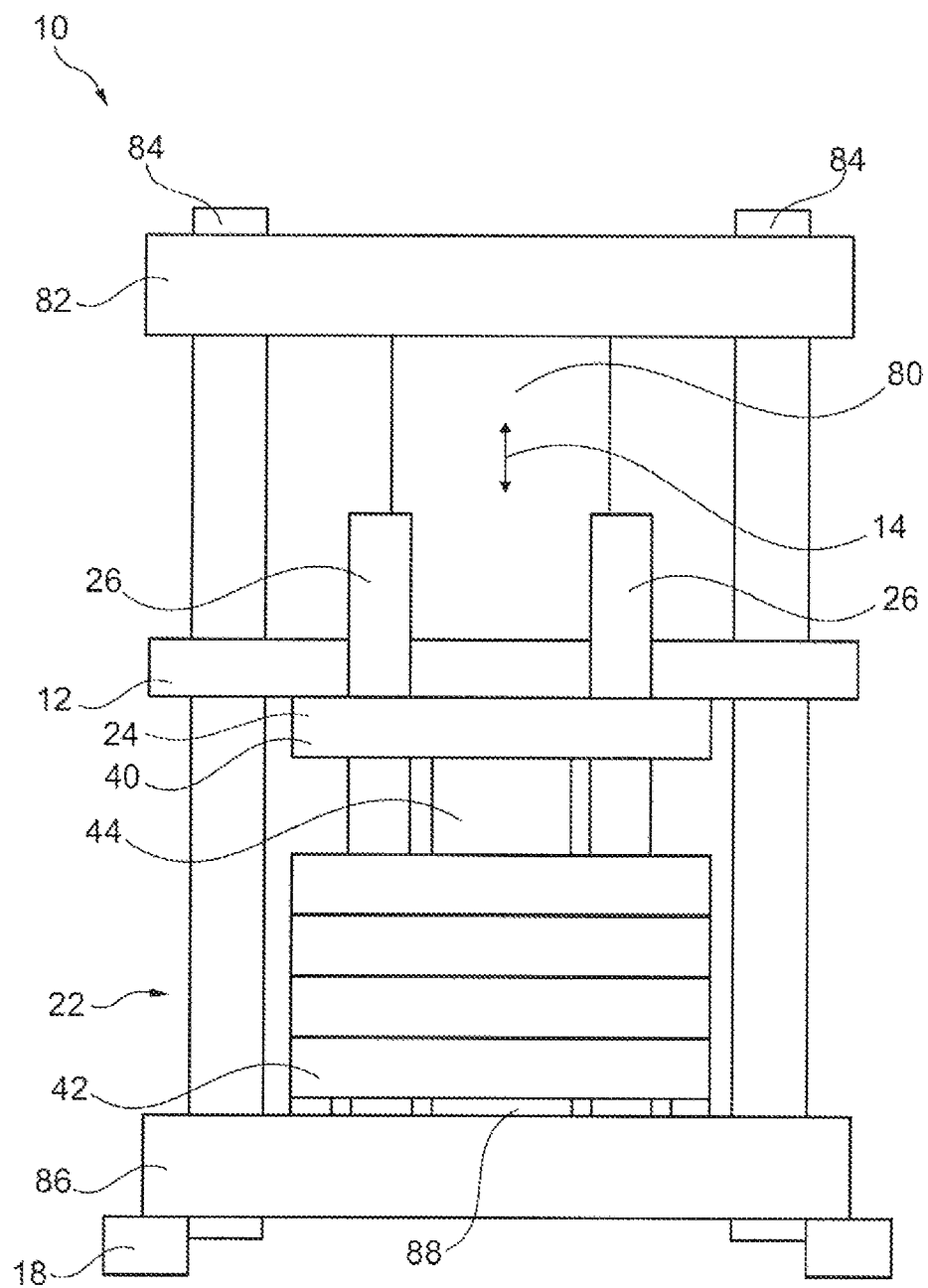

Further advantages, goals, and properties of the present invention will be explained using the following description of exemplary embodiments, which are particularly shown also in the attached drawing. The drawing shows:

FIG. 1 a schematic partial section through a powder press adapter;

FIG. 2 a section along the line II-II according to FIG. 1, through the powder press adapter according to FIG. 1;

FIG. 3 a schematic side view of a powder press in a readiness position, with powder press adapter;

FIG. 4 the powder press according to FIG. 3 in a front view;

FIG. 5 the powder press according to FIGS. 3 and 4 in the view according to FIG. 4, without the powder press adapter; and FIG. 6 the powder press according to FIGS. 3 to 5 in the view according to FIG. 4 or 5, with the powder press adapter in a pressing position.

The powder press 10, indicated in FIGS. 1 and 2 merely by its press carriage 12, carries a powder press adapter 20, of which a plurality can certainly be provided in order to optimize the operating sequence. As is particularly shown in FIG. 3, to illustrate the method of work, these powder press adapters can be moved into the actual press region and back out of it by way of wheels 48, on rails that are not shown in any detail but are sufficiently known from the state of the art. The pressing forces are applied, in the present exemplary embodiment, by means of an upper piston 80 of the powder press 10, in a pressing direction 14, whereby this upper piston 80 acts on an upper press part 82, on the one hand, and on the press carriage 12, on the other hand, as is particularly evident from FIGS. 3 to 6. In this connection, the pressing forces are applied to a pressed material that was prepared in the powder press adapter 20, by way of the upper press part 82, tension rods 84, and a lower press part 86, which rests on a set-up frame 18, in known manner, from both sides of the pressing direction 14. For this purpose, the press carriage 12, on the one hand, and the lower press part 86, on the other hand, acts on the powder press adapter 20.

The powder press adapter 20 in turn comprises a die carrier 22 that is formed, in the present case, from three die plates 30, which in turn comprise or form a die 32 for accommodation of the powder to be pressed, in a manner that is not explained in detail.

The die carrier 22 has four passage openings 34, in which guide rods 26 are disposed, which carry a head plate 40 and a foot plate 42, which can be displaced relative to one another in the pressing direction 14, in known manner. In this connection, in the present exemplary embodiment, the head plate 40 forms a counter-yoke 24 to the die plate 30, whereby in alternative exemplary embodiments, the foot plate 42 can also serve as a counter-yoke, cumulatively or alternatively to this. Likewise, in this exemplary embodiment, an upper punch 44 is provided, which transfers pressing forces from the head plate 40 to the die plates 30 (see, in particular, FIGS. 3 to 6), whereby this punch is configured passively in the present exemplary embodiment, but can also work actively in other exemplary embodiments, similar to the upper piston 80. In the lower region, the powder press 10 also has an adapter clamping device 88, which secures the powder press adapter 20, and, in particular, the foot plate 42, in a pressing position in this exemplary embodiment, whereby in this connection, a sufficient distance for the wheels 48 or for corresponding stress relief is provided. In an alternative embodiment, a lower punch for applying the pressing forces can be provided at this location.

The head plate 40, the foot plate 42, and the die carrier 22 are mounted on the guide rods 26 in known manner, by way of known slide bearings 28. However, in deviation from this, a spacer 50 is provided on two diagonally opposite guide rods 26, in the die plate 30, which spacer, however, also has a guiding effect because of its configuration, as will be explained below. Furthermore, the slide bearing 28 of the counter-yoke 24 or of the head plate 40 on the guide rods 26, which have a spacer 50, is correspondingly adapted.

Each spacer 50 has a piston 52 that can support itself on a holding surface 54 in a corresponding recess of the counter-yoke 24 or the head plate 40, in order to maintain a desired distance. Each of these pistons 52 surrounds the guide rod 26, in each instance, and is disposed in a cylinder 56 to which hydraulic pressure can be applied by way of a line 58. It is understood that this arrangement can guarantee corresponding guidance of the counter-yoke 24 as well as of the die carrier 22 on the guide rod 26, by means of suitable sealing devices (not numbered in detail).

By means of suitably applying a hydraulic fluid to the line 58, the spacers 50 can be set up to maintain the distance. By means of closing a corresponding valve as a locking device, such an operational state can be maintained even over an extended period of time, without further measures being necessary. Opening of the corresponding valve, for example only slightly, or opening an orifice hole makes it possible to set up the spacer 50 resiliently, so that a press pressure in the pressing direction 14 can become effective, accordingly. In this connection, it is understood that the present spacers 50 can become effective also as lifting devices, by means of applying pressure to the cylinders 56.

Furthermore, it is understood that the spacers 50, in an alternative embodiment, in which pneumatic devices are used, for example, or pneumatic pressure equalization is provided, can also be configured to have spring action.

As is directly evident, the spacers 50 surround the passage openings 34, in each instance, which in turn surround the guide rods 26. In this connection, a comparison of FIGS. 1 and 2 shows that this is particularly the case in the vertical projection along the pressing direction 14, as is directly evident from FIG. 2. Furthermore, the spacers 50 are disposed with rotation symmetry, in each instance, with reference to the passage openings 34. In this connection, it is understood that in a different embodiment, individual spacers can also be provided as partial spacers, symmetrically around the passage openings 34, in each instance, or their center axes 36.

As is particularly evident from FIG. 2, the two spacers 50 are furthermore disposed with mirror symmetry or rotation symmetry with reference to a punch axis 16, which is provided parallel to the pressing direction 14 and centered parallel with reference to the applied pressing forces. As is directly evident, not only the passage openings 34 but also the guide rods 26 and the spacers 50 are disposed truly parallel to the punch axis 16. In this manner, the above modules do not hinder the pressing process in any manner, and also bring about minimization of the risk of possible incorrect settings by means of their symmetrical configuration.

Corresponding spacers 50—also merely one corresponding spacer—can also be provided on the underside of the die plate 30 or on the foot plate 42, in order to be able to implement the advantages described above there, as well.

REFERENCE SYMBOL LIST 10 powder press
12 press carriage
14 pressing direction
16 punch axis
18 set-up frame
20 powder press adapter
22 die carrier
24 counter-yoke
26 guide rod
28 slide bearing
30 die plate
32 die 34 passage opening
36 center axis of the passage opening
40 head plate
42 foot plate
44 upper punch
48 wheel
50 spacer
52 piston
54 holding surface
56 cylinder
58 line
80 upper piston
82 upper press part
84 tension rod
86 lower press part
88 adapter clamping device

The invention claimed is:

1. Powder press or press adaptor for pressing powder comprising a powder press having at least one die carrier, wherein the powder press has at least one counter-yoke that can be displaced relative to the die carrier, comprising at least one of
 (a) a spacer that is in effect between the die carrier and the counter-yoke and
 (b) a lifting device that is in effect between the die carrier and the counter-yoke,
which spacer or device comprises a cylinder and a piston,
 wherein the cylinder surrounds a passage opening through the die carrier or through the counter-yoke,
 wherein at least one of the cylinder and the piston surrounds a guide rod,
 wherein the piston is disposed in said cylinder, and
 wherein a line can apply hydraulic pressure to said cylinder.

2. Powder press or press adaptor according to claim 1, wherein at least one of the passage opening and the guide rod is parallel to a punch axis.

3. Powder press or press adaptor according to claim 2, wherein the passage opening surrounds a guide rod.

4. Powder press or press adaptor for pressing powder comprising a powder press having at least one die carrier, wherein the powder press has at least one counter-yoke that can be displaced relative to the die carrier, comprising at least one of
 (a) a spacer that is in effect between the die carrier and the counter-yoke and
 (b) a lifting device that is in effect between the die carrier and the counter-yoke,
which spacer or device comprises a module within at least one of the die carrier and the counter-yoke,
 wherein a line can apply hydraulic pressure to said module.

5. Powder press or press adaptor according to claim 4, wherein the module is at least one of a cylinder and a piston of the spacer or of the lifting device.

6. Powder press or press adaptor according to claim 4, wherein at least one of the spacer and the lifting device is configured symmetrically with reference to a passage opening through at least one of the die carrier and the counter-yoke, wherein the passage opening is parallel to a punch axis.

7. Powder press or press adaptor according to claim 6, wherein the passage opening surrounds a guide rod.

8. Powder press or press adaptor according to claim 6, wherein the spacer or the lifting device surrounds the passage opening.

9. Powder press or press adaptor for pressing powder comprising a powder press having at least one die carrier, wherein the powder press has at least one counter-yoke that can be displaced relative to the die carrier, comprising a spacer that is in effect between the die carrier and the counter-yoke, which is configured to maintain the distance in a first of its operational states and resiliently in a second of its operational states,
 wherein the spacer comprises a piston and a corresponding cylinder, said cylinder surrounding a passage opening through the die carrier or through the counter-yoke, and said cylinder surrounding a guide rod,
 wherein said piston is disposed in said cylinder, and
 wherein a line can apply hydraulic pressure to said cylinder.

10. Powder press or press adaptor according to claim 9, wherein the spacer is configured to have a spring action.

11. Powder press or press adaptor according to claim 1, wherein the spacer or the lifting device is parallel to a punch axis.

12. Powder press or press adaptor according to claim 1, wherein the spacer or the lifting device has a locking device.

13. Powder press or press adaptor according to claim 1, further comprising at least two such spacers or lifting devices, which are in effect in parallel.

14. Method for operation of a powder press,
 in which a die carrier and at least one counter-yoke that can be displaced relative to the die carrier are held at a defined distance during a first operational state via a spacer or via lifting device as a line applies hydraulic pressure to said spacer or to said lifting device, and
 in which the die carrier and the at least one counter-yoke are released, in this regard, during a second operational state, wherein the spacer or the lifting device is released in the direction of the defined distance for the release of the die carrier and of the counter-yoke
 wherein said spacer or said lifting device comprises a module within at least one of the die carrier and the counter-yoke, and
 wherein said line applies hydraulic pressure to said module.

15. Method according to claim 14, wherein the spacer is unlocked to release it.

* * * * *